United States Patent
Choi et al.

(10) Patent No.: US 11,077,856 B2
(45) Date of Patent: Aug. 3, 2021

(54) METHODS AND SYSTEM FOR ADAPTING OPERATION OF A TRANSMISSION CLUTCH

(71) Applicant: Ford Global Technologies, LLC, Dearborn, MI (US)

(72) Inventors: Jaewon Choi, Northville, MI (US); Jianping Zhang, Ann Arbor, MI (US); Steve Michael Cicala, Dearborn Heights, MI (US); Kendrick Morrison, Wayne, MI (US); Kurt Howard Nickerson, Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/424,354

(22) Filed: May 28, 2019

(65) Prior Publication Data

US 2020/0377103 A1 Dec. 3, 2020

(51) Int. Cl.
| | |
|---|---|
| *B60W 10/08* | (2006.01) |
| *B60W 30/19* | (2012.01) |
| *B60W 30/02* | (2012.01) |
| *B60W 20/10* | (2016.01) |
| *B60W 10/02* | (2006.01) |

(Continued)

(52) U.S. Cl.
CPC ............ *B60W 30/19* (2013.01); *B60W 10/02* (2013.01); *B60W 10/08* (2013.01); *B60W 20/10* (2013.01); *B60W 30/025* (2013.01); *B60W 10/115* (2013.01); *B60W 20/14* (2016.01); *B60W 2030/203* (2013.01); *B60W 2510/0216* (2013.01); *B60W 2510/0275* (2013.01); *B60W 2710/023* (2013.01); *B60W 2710/027* (2013.01); *B60W 2710/083* (2013.01); *F16D 2500/10406* (2013.01); *F16D 2500/3024* (2013.01); *F16D 2500/3027* (2013.01);

(Continued)

(58) Field of Classification Search
CPC .... B60W 30/19; B60W 30/025; B60W 20/10; B60W 2030/203; B60W 10/08; B60W 10/115; B60W 20/14; B60W 2510/0275; B60W 2510/0216; B60W 2710/027; B60W 2710/023; B60W 2710/083; B60W 10/02; F16D 2500/3024; F16D 2500/3027; F16D 2500/10406; F16D 2500/3101; F16D 2500/5018; F16D 2500/50245; Y10T 477/26
USPC .............................................. 701/58, 59, 67
See application file for complete search history.

(56) References Cited

U.S. PATENT DOCUMENTS

| | | | |
|---|---|---|---|
| 9,616,895 B2 | 4/2017 | Nefcy et al. | |
| 2004/0152558 A1* | 8/2004 | Takami | B60W 20/00 477/3 |

(Continued)

FOREIGN PATENT DOCUMENTS

| | | |
|---|---|---|
| DE | 102013104315 A1 | 11/2013 |
| KR | 20180067838 A | 6/2018 |

*Primary Examiner* — Roger L Pang
(74) *Attorney, Agent, or Firm* — Vincent Mastrogiacomo; McCoy Russell LLP

(57) ABSTRACT

Systems and methods for operating a vehicle that includes an engine and an electric machine are described. In one example, an actual total number of transmission gear downshifts are counted to determine whether or not a transmission clutch characterization is immature. The transmission clutch characterization may be adjusted if it is determined to be immature.

9 Claims, 6 Drawing Sheets

(51) Int. Cl.
 *B60W 30/20* (2006.01)
 *B60W 20/14* (2016.01)
 *B60W 10/115* (2012.01)

(52) U.S. Cl.
 CPC ............. *F16D 2500/3101* (2013.01); *F16D 2500/5018* (2013.01); *F16D 2500/50245* (2013.01)

(56) References Cited

U.S. PATENT DOCUMENTS

| | | | | |
|---|---|---|---|---|
| 2005/0054480 | A1* | 3/2005 | Ortmann | B60W 10/06 477/6 |
| 2013/0296100 | A1* | 11/2013 | Nefcy | B60W 20/14 477/4 |
| 2016/0101769 | A1* | 4/2016 | Gibson | F16D 48/06 477/5 |
| 2016/0159343 | A1* | 6/2016 | Hata | B60W 10/02 477/5 |
| 2016/0207523 | A1* | 7/2016 | Kotsuji | B60W 20/00 |
| 2016/0375889 | A1* | 12/2016 | Kim | B60K 6/387 701/22 |
| 2017/0166194 | A1* | 6/2017 | Kumazaki | B60W 20/14 |
| 2018/0099654 | A1* | 4/2018 | Shin | B60W 20/30 |
| 2018/0257635 | A1* | 9/2018 | Meyer | B60W 10/08 |
| 2019/0135267 | A1* | 5/2019 | Kim | B60W 20/15 |
| 2020/0086874 | A1* | 3/2020 | Burt | B60W 20/00 |

* cited by examiner

METHODS AND SYSTEM FOR ADAPTING OPERATION OF A TRANSMISSION CLUTCH

FIELD

The present description relates to methods and a system for a hybrid vehicle that includes an electric machine for propelling a vehicle.

BACKGROUND AND SUMMARY

A hybrid vehicle may include an electric machine that may provide a propulsion force to the hybrid vehicle. The electric machine may be located upstream of a transmission in a driveline. During low torque demand conditions, the electric machine may propel the hybrid vehicle by itself. During high torque demand conditions, the electric machine may provide assistance to an internal combustion engine to propel the hybrid vehicle. The electric machine may also generate a regenerative braking torque when driver demand torque is low and vehicle deceleration is desirable. The electric machine may convert the vehicle's kinetic energy into electric energy while it is providing the regenerative braking torque. The vehicle's transmission may also be shifted from a first gear to a second gear during conditions when the electric machine and/or engine are providing the torque to the hybrid vehicle's driveling. If operating characteristics of an on-coming clutch are unknown or inaccurate, the shifts may create driveline torque disturbances that may be objectionable to vehicle occupants. The magnitude of the driveline torque disturbances may increase as the amount of torque that is provided to the hybrid vehicle driveline increases. Therefore, it may be desirable to provide a way of determining transmission clutch operating characteristics so that the possibility of objectionable driveline torque disturbances may be reduced.

The inventors herein have recognized the above-mentioned issues and have developed a powertrain operating method, comprising: adjusting a torque threshold of an electric machine via a controller in response to an indication that a transmission clutch characterization is immature; adjusting the transmission clutch characterization via the controller in response to the transmission clutch characterization being immature; and applying or releasing a transmission clutch responsive to the transmission clutch characterization.

By adjusting a torque threshold of an electric machine in response to an indication that a transmission clutch characterization is immature, it may be possible to provide the technical result of reducing driveline torque disturbances. Specifically, the torque threshold of the electric machine may be adjusted so that a transmission clutch may be characterized during a transmission gear downshift so that driveline gear shifting may be improved. By reducing the torque threshold of the electric machine, areas of the transmission clutch characterization where clutch torque capacity is low may be learned during transmission gear downshifts so that the possibility of driveline torque disturbances that are related to transmission gear shifts may be reduced.

The present description may provide several advantages. In particular, the approach may improve opportunities to characterize transmission clutches. Further, the approach may be performed occasionally so that opportunities to enter regenerative braking may be preserved. In addition, the approach may allow some regenerative braking even during conditions where the transmission clutch is being characterized.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 5:
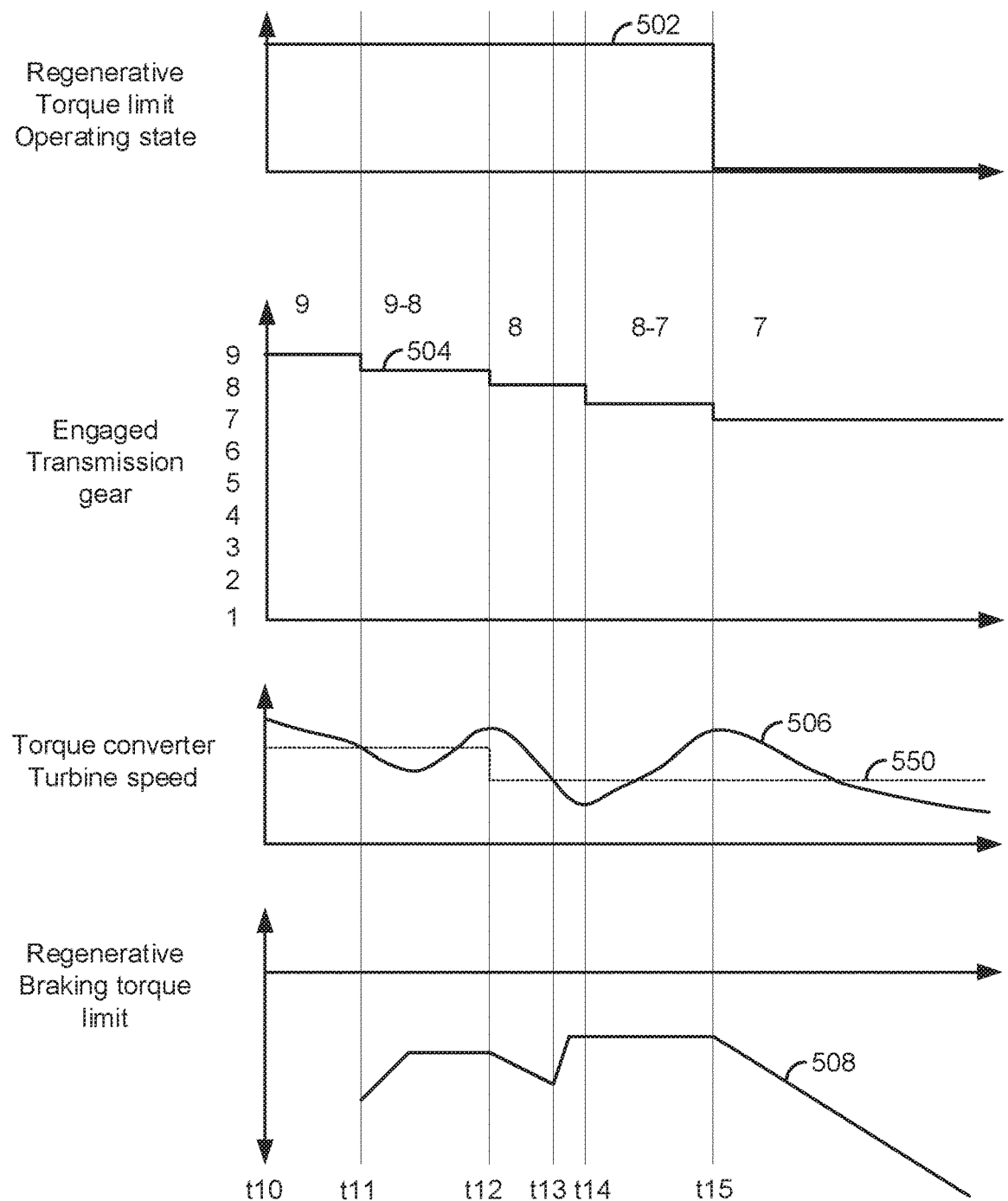
Figure 6:
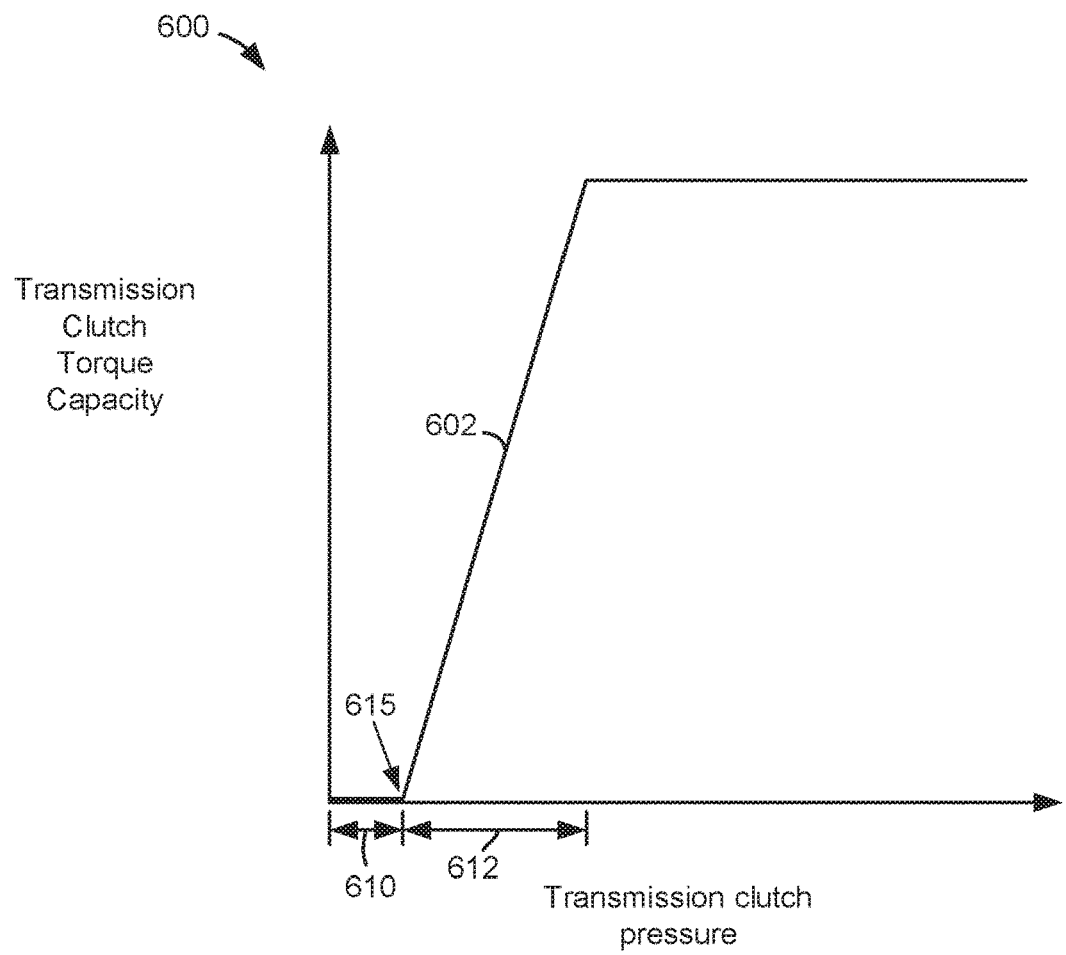
FIG. 6 shows an example transmission clutch characterization.

The present description is related to operating a hybrid vehicle that includes an engine and an electric machine. The electric machine may be operated in a way that improves the opportunities to adapt clutches of a transmission so that smoother transmission gear shifts may be provided. The driveline may include an engine of the type shown in FIG. 1. The engine may be included in a driveline as shown in FIG. 2. The vehicle driveline may include the method of FIG. 3. The method of FIG. 3 and the system of FIGS. 1 and 2 may provide the operating sequences shown in FIGS. 4 and 5. An example transmission clutch characterization or transfer function is shown in FIG. 6.

Figure 1:
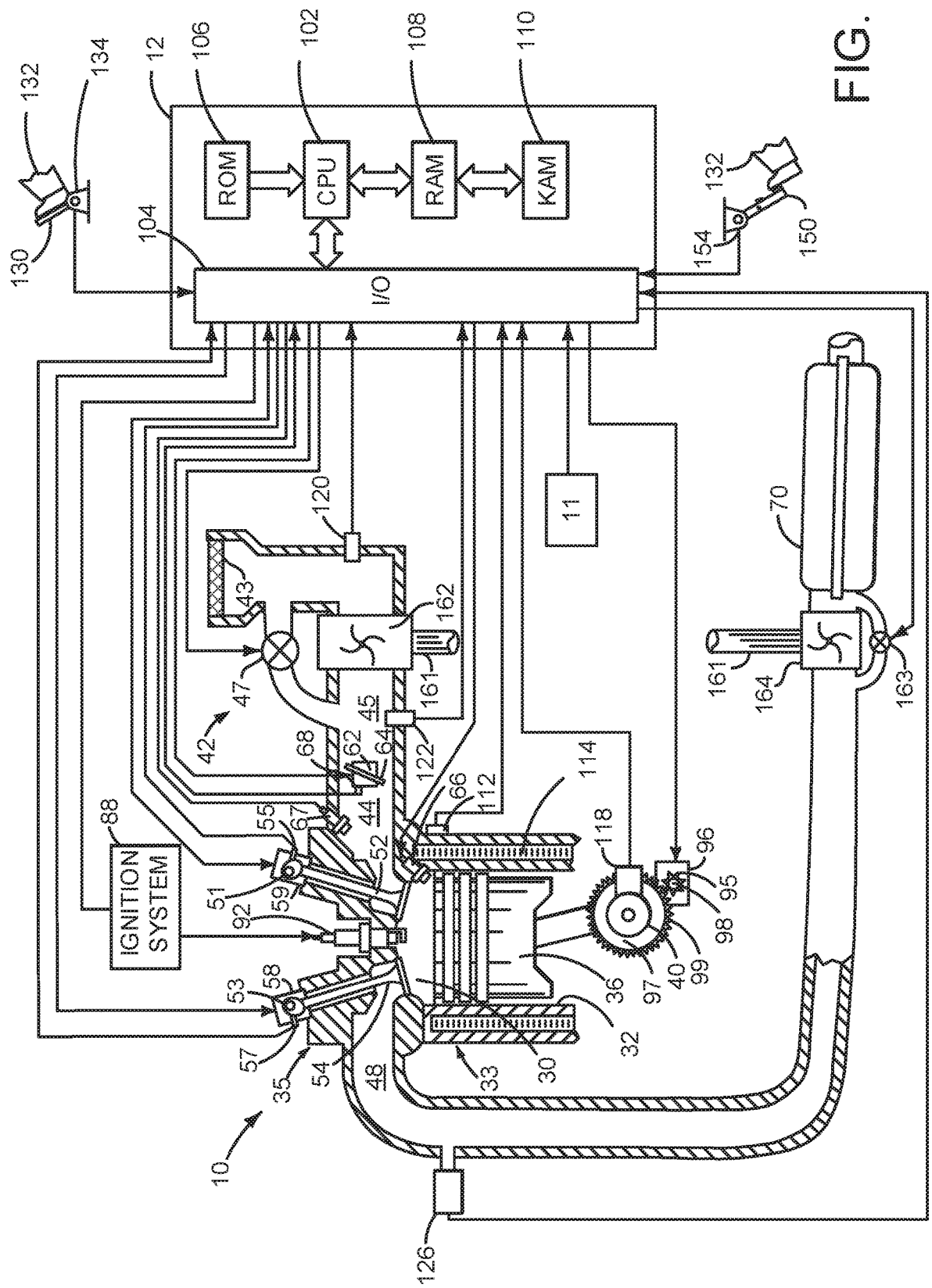
FIG. 1 is a schematic diagram of an engine.
Figure 2:
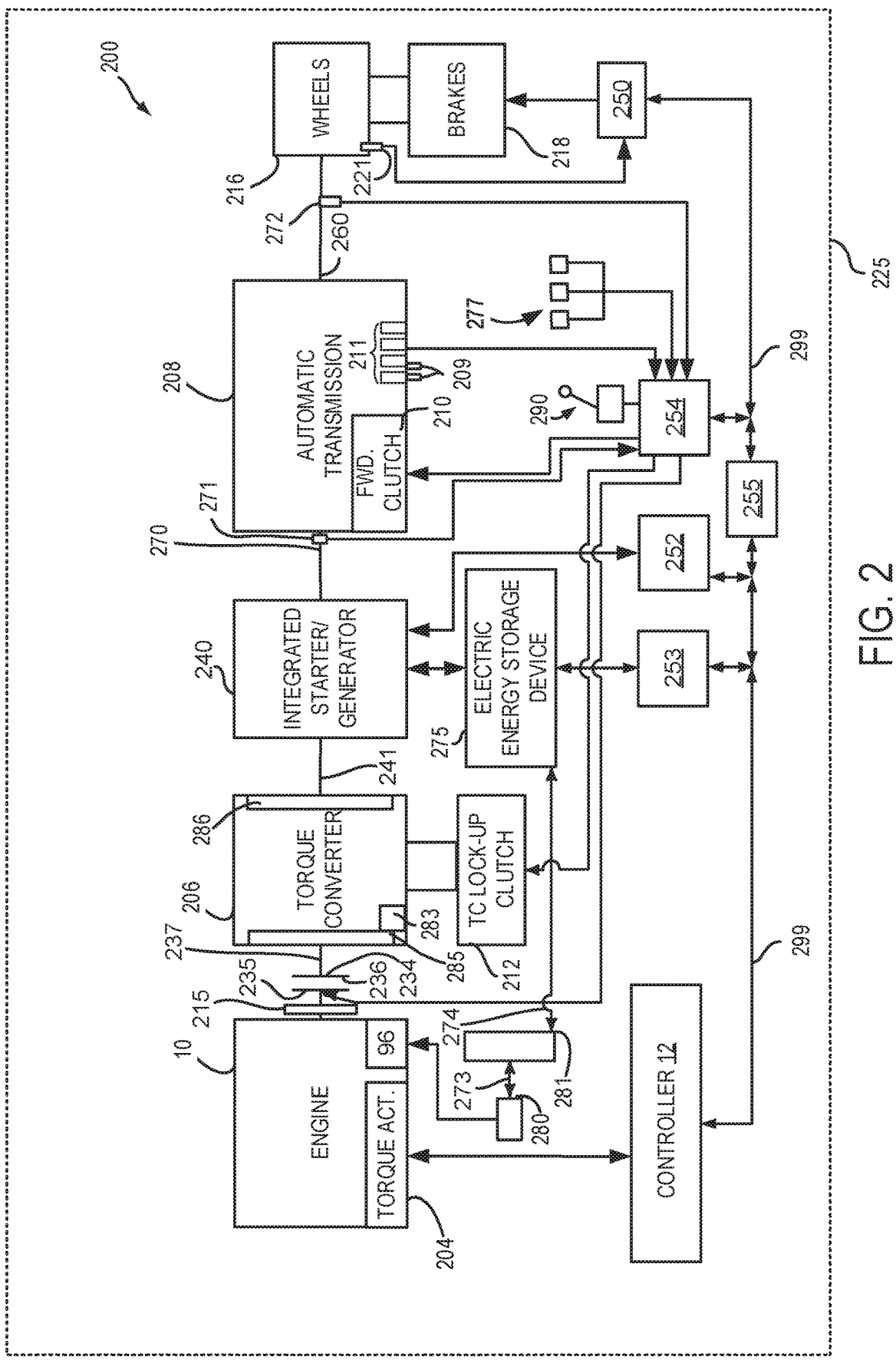
FIG. 2 is a schematic diagram of a vehicle driveline.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1-3. The controller employs the actuators shown in FIGS. 1-2 to adjust engine and driveline or powertrain operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 via solenoid 93 to engage ring gear 99. Optional starter 96 may be directly mounted to the front of the engine or the rear of the engine. In some examples, starter 96 may selectively supply power to crankshaft 40 via a belt or chain. In one example, starter 96 is in a base state when not engaged to the engine crankshaft 40 and flywheel ring gear 99.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Direct fuel injector 66 is shown positioned to inject fuel directly into cylinder 30, which is known to those skilled in the art as direct injection. Port fuel injector 67 is shown positioned to inject fuel into the intake port of cylinder 30, which is known to those skilled in the art as port injection. Fuel injectors 66 and 67 deliver liquid fuel in proportion to pulse widths provided by controller 12. Fuel is delivered to fuel injectors 66 and 67 by a fuel system (not shown) including a fuel tank, fuel pump, and fuel rail (not shown).

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of three-way catalyst 70. Alternatively, a two-state exhaust gas oxygen sensor may be substituted for UEGO sensor 126.

Catalyst 70 may include multiple bricks and a three-way catalyst coating, in one example. In another example, multiple emission control devices, each with multiple bricks, can be used.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 (e.g., a human/machine interface) for sensing force applied by human driver 132; a position sensor 154 coupled to brake pedal 150 (e.g., a human/machine interface) for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start or stop the engine or vehicle may be generated via a human and input to the human/machine interface 11. The human/machine interface 11 may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel power or a wheel power level to provide a desired rate of vehicle deceleration. The requested desired wheel power may be provided by vehicle system controller 255 requesting a first braking power from electric machine controller 252 and a second braking power from engine controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or accelerate driveline and wheel rotation.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and/or electric machine 240. Engine 10 may be started via optional engine starting system shown in FIG. 1 or via driveline integrated starter/generator (ISG) 240 also known as an integrated starter/generator. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

Bi-directional DC/DC converter 281 may transfer electrical energy from a high voltage buss 274 to a low voltage buss 273 or vice-versa. Low voltage battery 280 is electrically coupled to low voltage buss 273. Electric energy storage device 275 is electrically coupled to high voltage buss 274. Low voltage battery 280 selectively supplies electrical energy to starter motor 96.

An engine output power may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to torque converter impeller 285 via shaft 237. Disconnect clutch 236 may be fully closed when engine 10 is supplying power to vehicle wheels 216. Disconnect clutch 236 may be fully open when engine 10 is stopped (e.g., not combusting fuel).

Torque converter 206 includes a turbine 286 to output power to shaft 241. Input shaft 241 mechanically couples torque converter 206 to ISG 240. Torque converter 206 also includes a torque converter bypass lock-up clutch 212 (TCC). Power is directly transferred from impeller 285 to turbine 286 when TCC is locked. TCC is electrically operated by controller 12. Alternatively, TCC may be hydraulically locked. In one example, the torque converter may be referred to as a component of the transmission. Torque may be transferred via fluid from impeller 285 to 286.

When torque converter lock-up clutch 212 is fully disengaged, torque converter 206 transmits engine power to automatic transmission 208 via fluid transfer between the torque converter turbine 286 and torque converter impeller 285 or vice-versa, thereby enabling torque multiplication. In contrast, when torque converter lock-up clutch 212 is fully engaged, the engine output power may be directly transferred via the torque converter clutch to an input shaft 241 of ISG 240. Alternatively, the torque converter lock-up clutch 212 may be partially engaged, thereby enabling the amount of engine torque directly relayed to the ISG to be adjusted. The transmission controller 254 may be configured to adjust the amount of torque transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

ISG 240 may be operated to provide power to powertrain 200 or to convert powertrain power into electrical energy to be stored in electric energy storage device 275 in a regeneration mode. ISG 240 is in electrical communication with energy storage device 275. ISG 240 has a higher output power capacity than starter 96 shown in FIG. 1. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the input shaft 270 of automatic transmission 208. The upstream side of the ISG 240 is mechanically coupled to the turbine 286 of torque converter 206. ISG 240 may provide a positive power or a negative power to powertrain 200 via operating as a motor or generator as instructed by electric machine controller 252.

ISG 240 may rotate turbine 286, which in turn may rotate impeller 285 to start engine 10 during engine starting. Torque converter 206 may multiply torque of ISG 240 to rotate engine 10 when driveline disconnect clutch 236 is fully closed. Thus, the torque of ISG 240 may be increased via torque converter 206 to rotate engine 10 during engine starting. TCC 212 may be fully open when ISG 240 is cranking engine 10 so that torque of ISG 240 may be multiplied. Alternatively, TCC 212 may be partially open when ISG 240 is cranking engine 10 to manage torque transfer to engine 10. ISG 240 may rotate at a greater speed than engine 10 during engine cranking.

Automatic transmission 208 includes gear clutches 211 (e.g., for gears 1-10) and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand power or power request from an accelerator pedal or other device. Vehicle system controller 255 then allocates a fraction of the requested driver demand power to the engine and the remaining fraction to the ISG. Vehicle system controller 255 requests the engine power from engine controller 12 and the ISG power from electric machine controller 252. If the engine power that flows through torque converter 206 and ISG power is less than a transmission input power limit (e.g., a threshold value not to be exceeded), the power is delivered to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 275, a charging power (e.g., a negative ISG power) may be requested while a non-zero driver demand power is present. Vehicle system controller 255 may request increased engine power to overcome the charging power to meet the driver demand power.

In response to a request to decelerate vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 275, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, sensor for determining torque transferred via the transmission clutches, gear shift lever sensors, and ambient temperature sensors. Transmission controller 254 may also receive requested gear input from gear shift selector 290 (e.g., a human/machine interface device). Gear shift lever may include positions for gears 1-N (where N is an upper gear number), D (drive), and P (park).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Figure 3:
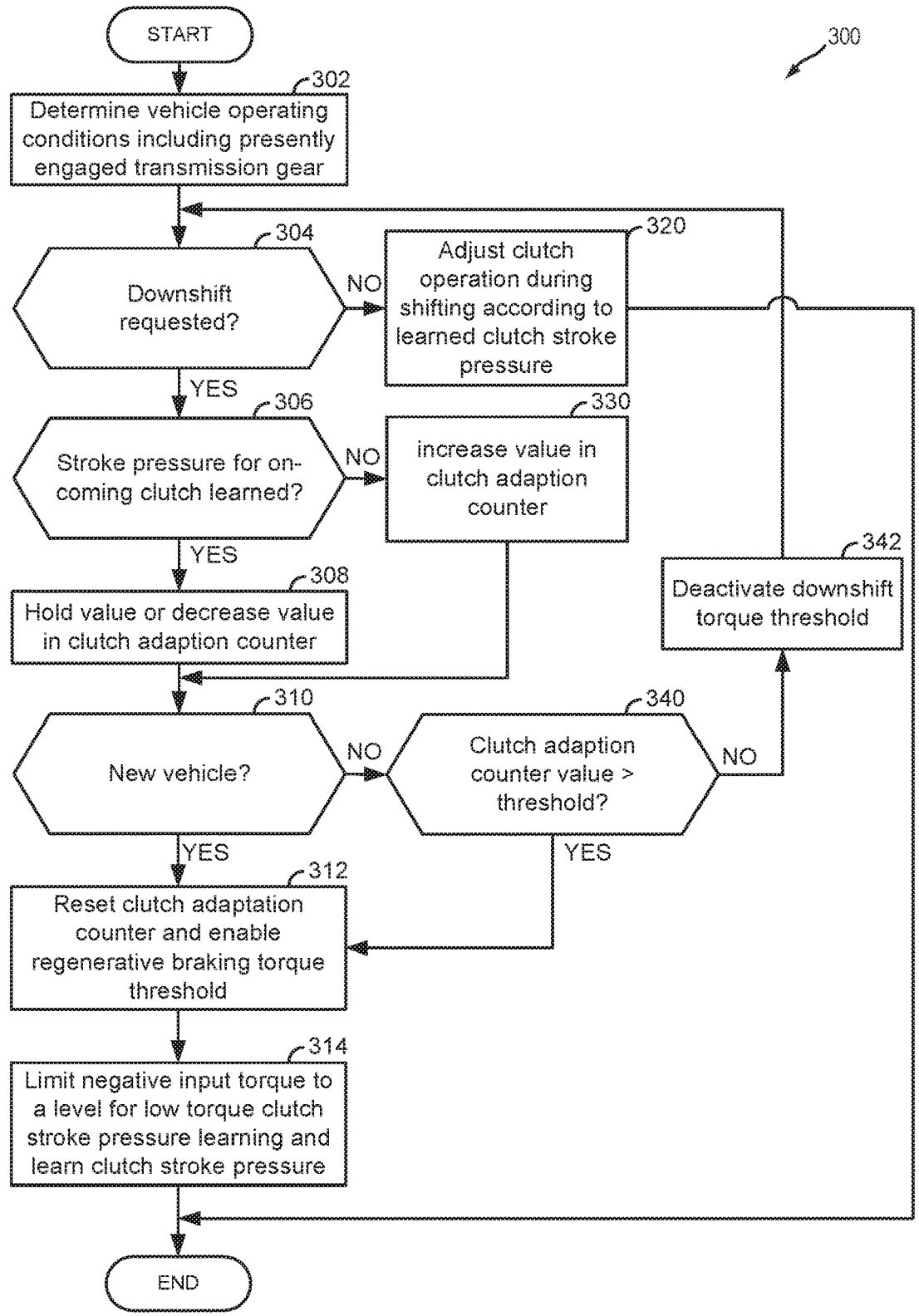
FIG. 3 shows a method for operating a driveline that includes a transmission.

Referring now to FIG. 3, a flow chart of a method for operating a vehicle driveline in a way that improves opportunities to adapt transmission clutch characterizations so that transmission gear shifting may be improved is shown. The method of FIG. 3 may be incorporated into and may cooperate with the system of FIGS. 1-2. Further, at least portions of the method of FIG. 3 may be incorporated as executable instructions stored in non-transitory memory while other portions of the method may be performed via a controller transforming operating states of devices and actuators in the physical world.

At 302, method 300 determines vehicle operating conditions. Vehicle operating conditions may include but are not limited to driver demand torque, vehicle speed, electric machine speed, engine speed, vehicle speed, engine temperature, electric energy storage device state of charge (SOC), and accelerator pedal position. Method 300 proceeds to 304.

At 304, method 300 judges if a transmission gear downshift (e.g., a shift from $4^{th}$ gear to $3^{rd}$ gear) is requested. A transmission gear downshift may be requested in response to vehicle speed and driver demand torque. For example, if vehicle speed is decreasing and driver demand torque is low, a transmission gear downshift may be requested. If method 300 judges that a transmission gear downshift is requested, the answer is yes and method 300 proceeds to 306. Otherwise, the answer is no and method 300 proceeds to 320. Vehicle speeds and driver demand torques at which gears are shifted may be different for each gear and the gears may be shifted according to one or more shift schedules that are stored in controller memory.

In addition, at 304, method 300 may proceed to 320 if a transmission temperature is less than a threshold where it may be difficult to accurately determine the transmission clutch stroke pressure. By proceeding to 320, method 300 may avoid energy consumption when adaptation may not yield useful results. The downshift may be scheduled when torque converter turbine speed is less than a threshold speed as shown in FIG. 5 so that the regenerative braking torque threshold may be activated when the torque converter turbine speed is reduced to less than a threshold speed.

At 320, method 300 adjusts operation of the transmission's clutches responsive to individual characterizations for each transmission clutch. The transmission clutch characterizations may be of the form shown in FIG. 6. During a transmission clutch engagement, a torque capacity of the transmission clutch may be adjusted according to a characterization of the transmission clutch as determined at 314. For example, a solenoid valve may be adjusted to control a pressure of transmission fluid that is supplied to the transmission clutch. The torque capacity of the transmission clutch is related to the pressure of a fluid that is applied to the clutch according to the transmission clutch characterization. Thus, the transmission clutch may be adjusted to a particular torque capacity by referencing a table or function that holds data representing the transmission clutch characterization via a desired or requested transmission clutch torque capacity. The function or table may output a transmission fluid pressure for achieving the requested transmission clutch torque capacity. The solenoid valve is adjusted to supply the fluid to the transmission clutch with a pressure that is equal to the transmission fluid pressure that is output from the table or function. The torque capacity of the transmission clutch may be adjusted during opening and closing of the transmission clutch. Trajectories for transmission clutch torque capacities that are applied during transmission gear shifting may be empirically determined and stored in controller memory as a function of gear being engaged/disengaged, driver demand torque, and transmission temperature. Transmission gear shifting schedules may be stored in controller memory. Method 300 proceeds to exit after adjusting transmission clutches according to vehicle operating conditions.

The regenerative braking torque threshold may be cleared at 320 if a downshift is not scheduled within a threshold amount of time. However, the regenerative braking torque threshold may also be maintained if a transmission gear downshift is scheduled within a predetermined amount of time since the most recent transmission gear downshift.

At 306, method 300 judges if the stroke pressure of a particular clutch (e.g., the clutch that will be fully closed in response to the downshift) has been determined. The stroke pressure is a pressure at which the particular clutch just begins to transfer torque from one side of the transmission clutch to the other side of the transmission clutch after the clutch begins to close after being fully opened. Alternatively, or in addition, method 300 may judge if the particular clutch characterization has been fully learned. For example, if the particular clutch characterization is described by ten data points and only eight data points have been determined, then method 300 may judge that the particular clutch has not been fully characterized. The particular clutch may be the clutch that engages the lower gear that is being engaged during a transmission downshift.

If method 300 judges that the stroke pressure for the particular transmission clutch was learned during a last time the particular transmission clutch closed, then the answer is yes and method 300 proceeds to 308. Alternatively, if method 300 judges that the entire transmission clutch characterization for the particular transmission clutch has been learned during a last time the particular transmission clutch was closed (or within a particular time or vehicle distance traveled interval), then the answer is yes and method 300 proceeds to 308. Otherwise, the answer is no and method 300 proceeds to 330.

At 330, method 300 increases a value that is stored in a counter (e.g. a clutch adaption counter) in the controller. The value may be increased by a value of one each time the particular transmission clutch is closed from a fully open state or at least from a state where less than a threshold amount of torque is transferred by the particular transmission clutch. There may be a counter for each transmission clutch, and the counter is associated with the particular transmission clutch. Method 300 proceeds to 310.

At 308, method 300 method 300 decreases, or alternatively holds, the value that is stored in a counter for the particular clutch in the controller. The value may be decreased by a value of one each time the particular transmission clutch is closed from a fully open state or at least from a state where less than a threshold amount of torque is transferred by the particular transmission clutch and the stroke pressure and/or transmission clutch characterization is not determined during the application of the particular clutch. Method 300 proceeds to 310.

At 310, method 300 judges whether or not the vehicle is a "green" or new vehicle. In one example, the vehicle may be determined to be new if it has travelled less than a threshold distance. If method 300 judges that the vehicle is new, the answer is yes and method 300 proceeds to 312. Otherwise, the answer is no and method 300 proceeds to 340. A determination that the vehicle is new may be an indication that the transmission clutch characterization is immature.

At 340, method 300 judges whether or not a present value in the counter that is associated with the particular clutch is greater than a threshold value (e.g., 20). If so, the answer is yes and method 300 proceeds to 312. Otherwise, the answer is no and method 300 proceeds to 342. A determination that the counter value is greater than a threshold may be an indication that the transmission clutch characterization is immature due to changes in vehicle operating conditions that have not been captured in the present transmission clutch characterization, which may be considered outdated. Further, by activating transmission clutch characterization learning responsive to a value in the clutch adaptation counter, the transmission clutch characterization may be performed periodically.

At 342, method 300 deactivates a regenerative braking torque threshold for the electric machine. The regenerative braking torque threshold for the electric machine is a torque magnitude that is not to be exceeded during transmission downshifting for the particular transmission gear that is being engaged during the present transmission gear downshift. For example, during a transmission gear downshift from $9^{th}$ gear to $8^{th}$ gear, the electric machine may not be able to absorb more than 40 Newton-meters of torque so that the clutch that engages $8^{th}$ gear may be re-characterized during the downshift from $9^{th}$ to $8^{th}$ gear. However, if characterization of the particular transmission clutch is not determined to be aged as determined via the value stored in the counter that is associated with the particular transmission clutch, then the regenerative braking threshold for the particular transmission clutch is deactivated and the electric machine may be permitted to consume its rated amount of torque, thereby increasing the amount of electric charge that may be stored in an electric energy storage device. Method 300 returns to 304.

At 312, method 300 resets the value that is stored in the counter that is associated with the particular transmission clutch to zero. Further, method 300 activates the regenerative braking torque threshold for the electric machine that is associated with the particular transmission clutch. The value of the regenerative braking torque threshold for the electric machine may be different for each transmission clutch. Further, the value of the regenerative braking torque threshold for the particular transmission clutch may be adjusted for vehicle operating conditions (e.g., transmission temperature and road surface conditions). By reactivating the regenerative braking torque threshold, the amount of torque that is transferred by the particular transmission clutch during the transmission gear downshift may be reduced to less than a threshold amount of torque so that pressures to control the particular transmission clutch at lower clutch capacity values may be determined. By learning transmission clutch torque capacities when lower fluid pressures are applied to the transmission clutch, it may be possible to improve characterization of transmission torque clutches and more accurately determine transmission clutch stroke pressures to that transmission shifting may be improved. Method 300 proceeds to 314.

At 314, method 300 limits or adjusts negative input torque of the electric machine responsive to the regenerative braking torque threshold so that low torque capacity transmission clutch stroke pressure for the particular clutch may be determined. Alternatively, or in addition, method 300 may limit or adjust the negative input torque of the electric machine responsive to the regenerative braking torque threshold so that the transmission clutch characterization for the particular clutch may be determined. For example, if the regenerative braking torque threshold is −40 Newton-meters of torque (e.g., 40 Newton-meters of torque from the driveline is absorbed from the driveline via the electric machine to generate electric charge), then the electric machine torque may be adjusted to provide a maximum of 40 Newton-meters of braking torque (e.g., negative torque) while the stroke pressure and/or transmission clutch characterization is being determined for the particular clutch.

Method 300 also learns the stroke pressure and/or characterizes the particular transmission clutch via slowly increasing pressure of fluid that is supplied to the particular transmission clutch. The pressure of the fluid is increased beginning at a time when the particular transmission clutch is fully released and open. The pressure of fluid that is supplied to the particular transmission clutch is stored to memory along with an amount of torque that is transferred by the particular clutch. The amount of torque that is transferred by the particular clutch may be determined via a sensor or via an estimate that is based on transmission component speeds and other conditions. The stroke pressure and transmission clutch characterization are stored in controller memory. Method 300 proceeds to exit.

In this way, adaptation of one or more transmission clutch characterizations may be performed since the amount of torque transferred or absorbed from the driveline during transmission gear downshifts is limited. This allows transmission clutch application pressures to be determined for smaller amounts of torque being transferred via the transmission clutches. Consequently, the possibility of a transmission clutch grabbing earlier than is expected may be reduced so that driveline torque disturbances may be reduced.

The method of FIG. 3 provides for a powertrain operating method, comprising: adjusting a torque threshold of an electric machine via a controller in response to an indication that a transmission clutch characterization is immature; adjusting the transmission clutch characterization via the controller in response to the transmission clutch characterization being immature; and applying or releasing a transmission clutch responsive to the transmission clutch characterization. The method includes where the torque threshold is a level of a regenerative braking torque that is not to be exceeded via the electric machine. The method includes where the transmission clutch characterization is a relationship between a pressure applied to the transmission clutch and an estimate of torque transferred via the clutch. The method includes where the transmission clutch characterization is determined to be immature based on output of a counter. The method further comprises counting an actual total number of vehicle decelerations where the transmission clutch characterization is not adjusted while a vehicle brake is applied and the transmission clutch is adjusted from a not applied state to an applied state. The method includes where adjusting the transmission clutch characterization includes determining a stroke pressure of the transmission clutch. The method includes where the stroke pressure is a pressure at which the transmission clutch begins to transfer torque across the transmission clutch. The method includes where adjusting the torque threshold of the electric machine includes reducing a magnitude of the torque threshold.

The method of FIG. 3 also provides for a powertrain operating method, comprising: counting an actual total number of transmission gear downshifts during which a transmission clutch characterization is not adjusted via a controller; adjusting the transmission clutch characterization via the controller in response to the actual total number of transmission gear downshifts during which the transmission clutch characterization is not adjusted via a controller exceeding a threshold; and applying or releasing a transmission clutch responsive to the transmission clutch characterization. The method includes where the transmission clutch characterization is a function of pressure applied to the transmission clutch. The method includes where counting the actual number of transmission gear downshifts includes increasing a count value by one each time a transmission gear downshift occurs via applying the transmission clutch. The method includes where counting the actual number of transmission gear downshifts includes adjusting a count value to zero in response to adjusting the transmission clutch characterization. The method further comprises closing the transmission clutch from a fully open state via increasing a pressure applied to the transmission clutch at a predetermined rate in response to the actual total number of transmission gear downshifts during which the transmission clutch characterization is not adjusted via a controller exceeding the threshold.

Figure 4:
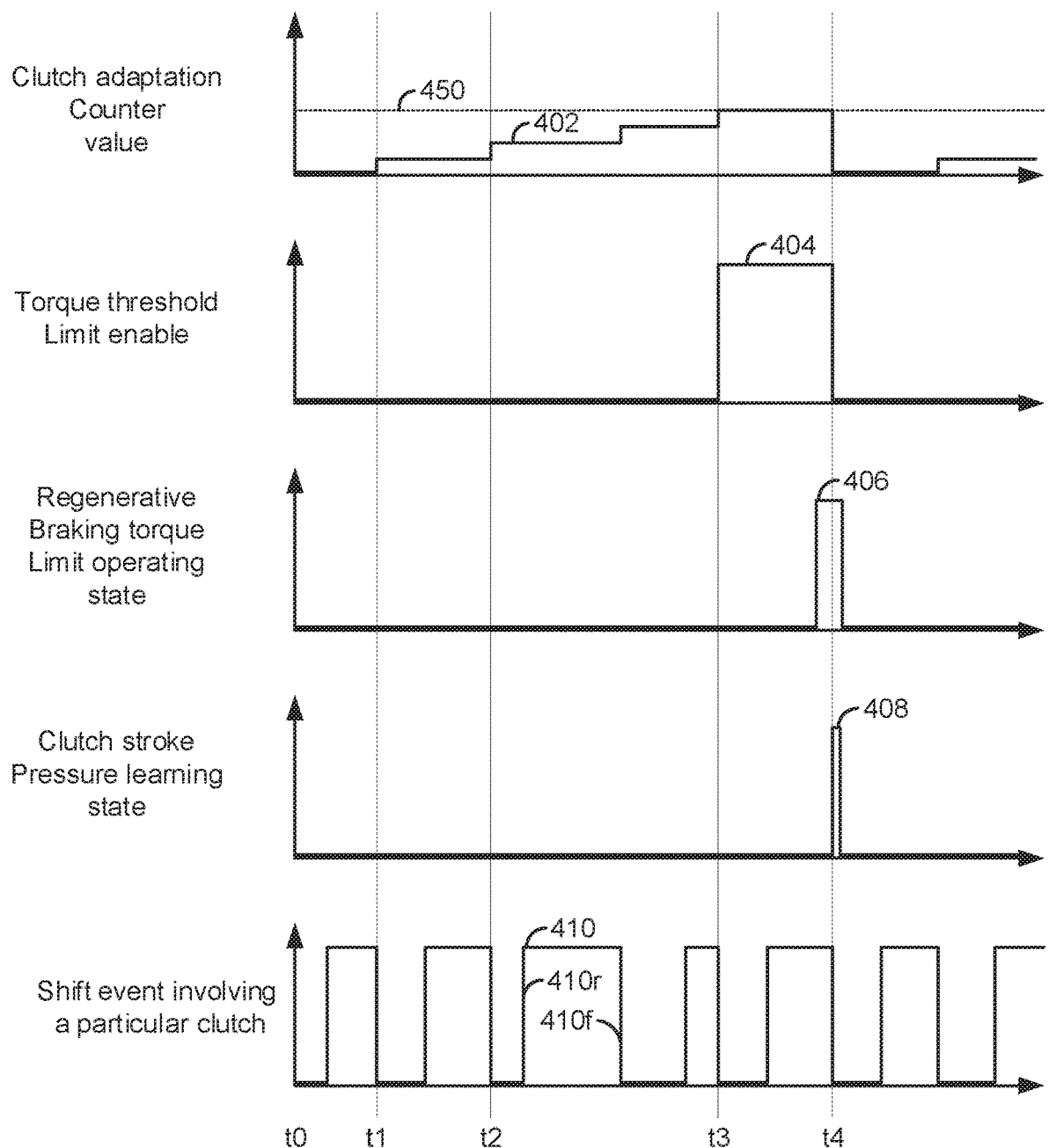
FIGS. 4 and 5 show example driveline operating sequences according to the method of FIG. 3.

Referring now to FIG. 4, plots of a prophetic vehicle operating sequence according to the method of FIG. 3 and the systems of FIGS. 1 and 2 are shown. The plots are aligned in time and occur at a same time. The vertical lines at t0-t6 show particular times of interest.

The first plot from the top of FIG. 4 is a plot of a value of a transmission clutch adaption counter versus time. The vertical axis represents the value of a transmission clutch adaption counter and the value of a transmission clutch adaption counter increases in the direction of the vertical axis arrow. The horizontal axis represents time and the time increases from the left side of the figure to the right side of the figure. Trace 402 represents the value of a transmission clutch adaption counter. Horizontal line 450 represents a threshold value at which the value of a transmission clutch adaption counter may be reset to zero and the transmission clutch being engaged in a present transmission gear downshift is being adapted (e.g., values of the transmission's clutch characterization are being adjusted and the stroke pressure may be determined).

The second plot from the top of FIG. 4 is a plot an operating state of a torque threshold limit enabling condition for the transmission gear that is being applied during the present transmission gear downshift. The vertical axis represents the operating state of the torque threshold limit enabling condition for the transmission clutch adaptation for the transmission gear that is being applied. The torque threshold limit enabling condition for transmission clutch adaptation for the transmission gear that is being applied is activated when trace 404 is at a higher level near the vertical axis arrow. The torque threshold limit enabling condition for transmission clutch adaptation for the transmission gear that is being applied is not activated when trace 404 is at a lower level near the horizontal axis. The horizontal axis represents time and the time increases from the left side of the figure to the right side of the figure. Trace 404 represents the operating state of the torque threshold limit enabling condition for the transmission clutch adaptation for the transmission gear that is being applied.

The third plot from the top of FIG. 4 is a plot an operating state that indicates when the regenerative braking torque threshold limit for transmission clutch adaptation is activated during the present transmission gear downshift. The vertical axis represents the operating state that indicates when the regenerative braking torque threshold limit for transmission clutch adaptation is activated during the present transmission gear downshift. The regenerative braking torque threshold limit for transmission clutch adaptation for the transmission gear that is being applied is activated when trace 406 is at a higher level near the vertical axis arrow. The regenerative braking torque threshold limit for transmission clutch adaptation for the transmission gear that is being applied is not activated when trace 406 is at a lower level near the horizontal axis. The horizontal axis represents time and the time increases from the left side of the figure to the right side of the figure. Trace 406 represents the operating state of the regenerative braking torque threshold limit for the transmission clutch adaptation for the transmission gear that is being applied.

The fourth plot from the top of FIG. 4 is a plot of operating state that indicates when transmission clutch stroke pressure and/or transmission clutch characterization learning is being performed versus time. The vertical axis represents the operating state that indicates when transmission clutch stroke pressure and/or transmission clutch characterization learning is being performed and operating state indicates that the transmission clutch stroke pressure and/or transmission clutch characterization is being learned when trace 408 is at a higher level near the vertical axis arrow. Transmission clutch characterization is not being performed when trace 408 is at a lower level near the horizontal axis. Trace 408 represents the operating state that indicates when transmission clutch stroke pressure and/or transmission clutch characterization learning is being performed.

The fifth plot from the top of FIG. 4 is a plot of shifting events for a particular transmission clutch for engaging a transmission gear (e.g., $8^{th}$ gear) versus time. The vertical axis represents the operating state of the transmission clutch and transmission clutch begins closing at the falling edges of trace 410. The transmission clutch is scheduled for closing based on vehicle operating conditions at the rising edge of trace 410. The horizontal axis represents time and the time increases from the left side of the figure to the right side of the figure. Trace 410 represents the shifting events for a particular transmission clutch. An example of a rising edge is shown at 410r. An example of a falling edge is shown at 410f.

At time t0, the value of the clutch adaption counter is zero and the torque threshold limit is not enabled. The regenerative braking torque limit is not activated and the clutch stroke pressure is not being learned. Further, shifting for the particular clutch has not been scheduled.

At time t1, the particular clutch begins to close to facilitate engaging $8^{th}$ gear in a downshift. The clutch adaptation counter is incremented by a value of one since the stroke pressure is not being learned. The torque threshold limit is not enabled and the regenerative braking torque limit is not activated. The clutch stroke pressure is not being learned.

Between time t1 and time t2, the transmission may upshift to $9^{th}$ gear and the clutch adaptation counter is not incremented. Further, the torque threshold limit is not enabled and the regenerative braking torque limit is not activated.

At time t2, the particular clutch begins to close to facilitate engaging $8^{th}$ gear in a downshift a second time. The clutch adaptation counter is incremented by a value of one again since the stroke pressure is not being learned. The torque threshold limit is not enabled and the regenerative braking torque limit is not activated. The clutch stroke pressure is not being learned.

Between time t2 and time t3, the particular clutch is closed again to facilitate engaging $8^{th}$ gear in a downshift a third time. The clutch adaptation counter is incremented by a value of one again since the stroke pressure is not being learned. The value in the counter stands at three. The torque threshold limit is not enabled and the regenerative braking torque limit is not activated. The clutch stroke pressure is not being learned.

At time t3, the particular clutch begins is closed yet again to facilitate engaging $8^{th}$ gear in a downshift a fourth time, but this time the value in the counter is equal to threshold 450 so the torque threshold limit is enabled. The clutch adaptation counter is incremented by a value of one to equal a value of four since the stroke pressure is not being learned. The regenerative braking torque limit is not activated since a downshift into $8^{th}$ gear is not scheduled. The clutch stroke pressure is not being learned.

At a time just before time t4, a downshift into $8^{th}$ gear is scheduled and the regenerative braking torque limit is activated. The torque threshold limit remains asserted and the value in the counter remains at four. The clutch stroke pressure is not being learned. At time t4, the particular clutch begins is closed yet again to facilitate engaging $8^{th}$ gear in a downshift a fifth time, but this time the value in the counter is reset to zero and clutch stroke pressure learning begins. The regenerative braking torque limit is applied so that the electric machine torque cannot exceed the regenerative braking torque limit. The clutch stroke pressure learning ends shortly after time t4 and the value in the clutch adaptation counter is zero.

In this way, a value in a counter may be a basis for adapting or not adapting a clutch stroke pressure and clutch characterization. Further, a regenerative braking torque limit for an electric machine may be activated while the transmission clutch characterization learning is being performed and it may be deactivated after the transmission clutch characterization learning is complete.

Referring now to FIG. 5, plots of a prophetic vehicle operating sequence according to the method of FIG. 3 and the systems of FIGS. 1 and 2 are shown. The plots are aligned in time and occur at a same time. The vertical lines at t10-t15 show particular times of interest.

The first plot from the top of FIG. 5 is a plot of an operating state of a regenerative braking torque limit versus time. The vertical axis represents the operating state of the regenerative braking torque limit and the regenerative braking torque limit is active when trace 502 is at a higher level near the vertical axis arrow. The regenerative braking torque limit is not active when trace 502 is near the horizontal axis. The horizontal axis represents time and the time increases from the left side of the figure to the right side of the figure. Trace 502 represents the regenerative braking torque limit operating state.

The second plot from the top of FIG. 5 is a plot of an engaged transmission gear versus time. The vertical axis represents the engaged transmission gear and the transmission gear numbers are indicated along the vertical axis. The horizontal axis represents time and the time increases from the left side of the figure to the right side of the figure. Trace 504 represents the engaged transmission gear.

The third plot from the top of FIG. 5 is a plot torque converter impeller speed versus time. The vertical axis represents the torque converter impeller speed and the torque converter impeller speed increases in the direction of the vertical axis arrow. The horizontal axis represents time and the time increases from the left side of the figure to the right side of the figure. Trace 506 represents the torque converter impeller speed. Horizontal line 550 represents a speed at which a downshift commences.

The fourth plot from the top of FIG. 5 is a plot of a regenerative braking torque limit or threshold for an electric machine versus time. The vertical axis represents the regenerative braking torque limit and the magnitude of the regenerative braking torque increased in the direction of the down pointing vertical axis arrow. The horizontal axis represents time and the time increases from the left side of the figure to the right side of the figure. Trace 508 represents the regenerative braking torque limit or threshold.

At time t10, the regenerative braking torque limit operating state is asserted to indicate that the regenerative braking torque limit may be activated. The transmission is engaged in $9^{th}$ gear and the torque converter turbine speed is declining. The regenerative braking limit is not presently applied because a downshift is not scheduled.

At time t11, the torque converter impeller speed falls below threshold 550 so the regenerative braking torque limit is activated and the electric machine may not exceed the level of line 508. In other words, the regenerative braking torque limit restricts electric machine torque between zero (the horizontal axis) and the amount represented by line 508 at time t11. The downshifting sequence begins and the regenerative braking torque limit operating state remains asserted.

Between time t11 and time t12, the regenerative braking torque limit or threshold is reduced further and then it levels off at a constant value. The torque converter impeller speed is reduced and then it begins to increase as the on-coming clutch begins to close.

At time t12, the downshift from $9^{th}$ to $8^{th}$ gear is completed and the regenerative torque limit operating state remains asserted. Eighth gear is engaged and the torque converter impeller speed begins to decline again. The regenerative braking torque limit begins to increase to a higher level while $8^{th}$ gear is engaged.

At time t13, the torque converter impeller speed falls below threshold 550 a second time and a downshift to $7^{th}$ gear is scheduled for engagement. The regenerative braking torque limit is reduced in response to $7^{th}$ gear being scheduled for engagement. The regenerative torque limit operating state remains asserted.

At time t14, the downshift from $8^{th}$ gear to $7^{th}$ gear begins and the torque converter impeller speed begins to increase as the on-coming clutch begins to engage. The regenerative braking limit has leveled off to a predetermined level and the regenerative braking torque limit operating state remains asserted.

At time t15, the downshift from $8^{th}$ to $9^{th}$ gear is completed and the regenerative torque limit operating state is cleared and not asserted. Seventh gear is engaged and the torque converter impeller speed begins to decline again. The regenerative braking torque limit begins to ramp to the electric machines rated torque limit.

In this way, the regenerative braking torque limit may be adjusted responsive to the gear that is being engaged during a transmission gear downshift. In addition, the regenerative braking torque limit may remain activated for one or more gear downshifts.

Referring now to FIG. 6, a plot of an example transmission clutch characterization or transfer function is shown. Plot 600 includes a vertical axis that represents transmission clutch torque capacity and a horizontal axis that represents pressure that is applied to the transmission clutch via transmission fluid. Trace 602 represents a relationship between the transmission clutch torque capacity and pressure that is applied to the transmission clutch. The transmission clutch stroke pressure is the transmission clutch pressure at position 615. The transmission clutch pressure is increased from zero (pressure at the vertical axis) over the range 610 until the transmission clutch capacity begins to increase at 615 (e.g., the transmission clutch stroke pressure). The transmission clutch torque capacity continues to increase over the range 612 and then the clutch is fully closed above when pressure applied to the clutch is above pressure in range 612.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A powertrain operating method, comprising:
adjusting a torque threshold of an electric machine via a controller in response to a value of a clutch adaption counter being greater than a threshold;
adjusting a relationship between transmission clutch pressure and transmission clutch torque capacity via the controller in response to the value of the clutch adaption counter being greater than the threshold; and
applying or releasing a transmission clutch responsive to the relationship between transmission clutch pressure and transmission clutch torque capacity.

2. The method of claim 1, where the torque threshold is a level of a regenerative braking torque that is not to be exceeded via the electric machine.

3. The method of claim 1, further comprising adjusting the torque threshold of the electric machine via the controller in response to a vehicle traveling less than a threshold distance.

4. The method of claim 1, further comprising counting an actual total number of vehicle decelerations where the relationship between transmission clutch pressure and transmission clutch torque capacity is not adjusted while a vehicle brake is applied and the transmission clutch is adjusted from a not applied state to an applied state.

5. The method of claim 1, where adjusting the relationship between transmission clutch pressure and transmission clutch torque capacity includes determining a stroke pressure of the transmission clutch.

6. The method of claim 5, where the stroke pressure is a pressure at which the transmission clutch begins to transfer torque across the transmission clutch.

7. The method of claim 1, where adjusting the torque threshold of the electric machine includes reducing a magnitude of the torque threshold from a rated amount of torque.

8. A system, comprising:
an engine in a hybrid vehicle driveline;
an electric machine in the hybrid vehicle driveline;
a rotation ratio changing device positioned in a driveline between the engine and the electric machine; and
a controller including executable instructions stored in non-transitory memory that cause the controller to adjust a torque threshold of the electric machine via the controller in response a value of a clutch adaption counter being greater than a threshold, and additional instructions that cause the controller to adjust the torque threshold of the electric machine in response to a vehicle traveling less than a threshold distance.

9. The system of claim 8, where adjusting the torque threshold includes decreasing a magnitude of the torque threshold from a rated amount of torque.

* * * * *